Figure 1:
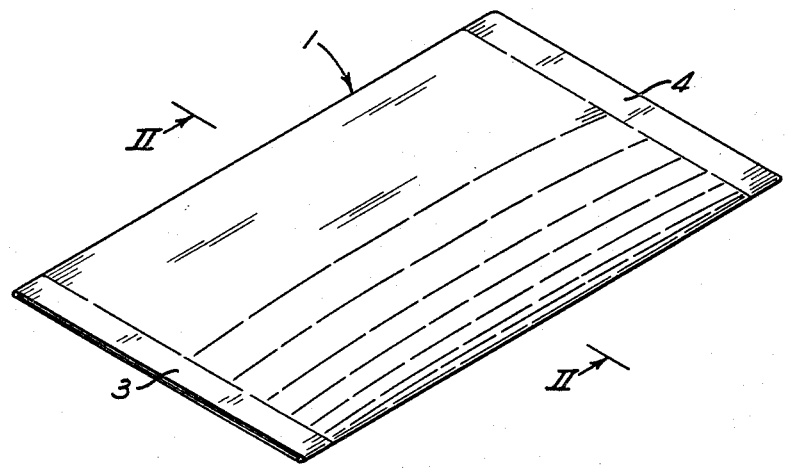

April 6, 1965  J. J. HRONAS  3,176,837
PACKAGE OF ACTIVATED CARBON IN WET FORM
Filed Dec. 20, 1963

INVENTOR.
JOHN J. HRONAS
BY
William L. Krayer.
ATTORNEY.

United States Patent Office 3,176,837
Patented Apr. 6, 1965

3,176,837
PACKAGE OF ACTIVATED CARBON IN
WET FORM
John J. Hronas, Greentree Borough, Pa., assignor to
Calgon Corporation, a corporation of Pennsylvania
Filed Dec. 20, 1963, Ser. No. 332,050
5 Claims. (Cl. 206—46)

This invention relates to packaging for mixtures of powdered activated carbon and diatomaceous earth in wet form.

Powdered activated carbon is widely used in industrial, commercial, and other types of water treatment for removal of objectionable tastes and odors. It is commonly used in combination with diatomaceous earth, which serves primarily as a filter aid. The carbon, and combinations thereof with diatomaceous earth, when used for the described purposes, must be replaced periodically because of exhaustion or fouling. The frequency of replacement depends on the composition of the water being treated and the degree of purity required.

Dry powdered activated carbon does not become wet easily. It is quite dusty and likely to be carried into the air at the slightest agitation and subsequently settle on nearby surfaces. Replacing the carbon charges in dry form is a dirty and undesirable task requiring some effort to insure that the carbon becomes wet. For these reasons it is desirable to package activated carbon in wet form.

Difficulties have been encountered, however, with carbon packaged in wet form. Foremost among them is the tendency of the carbon to become compacted into a solid mass on standing. Within a relatively short time, i.e., a few days' standing, the carbon will settle out, become compacted, and form a solid mass of a well-defined, rigid shape following the contours of the container. Such compacted masses are difficult to remove from their containers. The user of the replacement carbon may be unfamiliar with the peculiarities of carbon in this respect, and may conclude that the product is inferior or damaged, or he may damage it in trying to remove it from the container.

The problem of compaction is made more difficult by the interspersion with the carbon of an amount of diatomaceous earth, which is commonly used with the carbon as a filter aid. Diatomaceous earth in finely divided form is more strongly prone to compaction from wet suspensions than is carbon alone. Typical compositions for combination carbon diatomaceous earth products include water, about 55–75 parts by weight, about 10–35 parts by weight of powdered activated carbon, and about 1–10 parts by weight pulverized diatomaceous earth. Compositions within this range of ingredients are subject to the above described difficulties of compaction if they are likely to be left standing for at least a few days. The composition in wet form may consist only of pulverized carbon and water, in which case the carbon is preferably at least about 10% of the total weight, and no more than about 40% thereof.

I have invented a package for activated carbon and combinations thereof with diatomaceous earth in wet form which overcomes the above difficulties. It does not prevent compaction and absorption of water, but it does provide an easy means for restoring the product to an uncompacted state and rendering it workable. My invention contemplates packaging activated carbon in wet form and combinations thereof with diatomaceous earth in a tough, flexible container or bag, preferably pillow-shaped, which is capable of being kneaded while full, without tearing. A presently preferred form of such a package is seen in the accompanying drawing.

Figure 2:
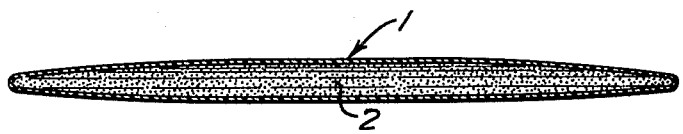

FIGURE 1 is a perspective view of a pillow-shaped flexible-walled container of carbon and filter-aid material.
FIG. 2 is a sectional view of the same container taken at II—II of FIG. 1.

In FIG. 1, the flexible bag 1 encloses about 260 grams of material to be described below, lending the container its distinctive shape. The bag is preferably made from a flexible polyethylene copolymer sleeve having a thickness of about 0.008 inch and heat-sealed at ends 3 and 4.

The sectional view of the same container in FIG. 2 shows a section taken at II—II. The composition 2 filling the container is preferably about 60–70 parts water, 10–35 parts carbon, and 2–6 parts diatomaceous earth. In the preferred package a composition of 29.6 parts by weight pulverized activated carbon, 66 parts by weight water, and 3.7 parts dicalite (diatomaceous earth) is used.

Such a container of activated carbon may be kneaded to eliminate even the worst cases of compaction so the composition may be restored to usable form after a period of storage. Kneading requires no particular strength and can in most cases result in fluidity of the product within a minute. The package is then cut open and the contents may be placed in service immediately.

Should the manufacturer wish to provide a packaged filter aid such as diatomaceous earth in wet form, my invention is also applicable to diatomaceous earth-water mixtures of any strength at which compaction occurs. Normally, such replacement charges will be about 5% to about 50% diatomaceous earth in water.

The size of the package may vary considerably. As long as it may be kneaded without damaging the package wall, the requirements of the invention are satisfied. A volume of one-half gallon of carbon slurry can easily be accommodated in a package of the described type. The wall thickness is not important as long as the material is flexible enough to be kneaded and strong enough to be kneaded without damage.

I do not intend to be limited to the above described examples, which are for illustrative purposes only. My invention may be otherwise variously described within the terms of the following claims.

I claim:
1. A packaged activated carbon diatomaceous earth filter charge replacement in wet form comprising about 55 to about 75 parts by weight of water, about 10 to about 35 parts by weight of pulverized activated carbon, and about 1 to about 10 parts by weight pulverized diatomaceous earth, all enclosed in a flexible container capable of being kneaded without tearing.

2. A packaged activated carbon charge replacement comprising a pulverized activated carbon-water mixture consisting of at least 10% by weight but no more than about 40% by weight of pulverized activated carbon, enclosed in a flexible container capable of being kneaded without tearing.

3. A packaged activated carbon diatomaceous earth filter charge replacement comprising about 60 to about 70 parts by weight of water, about 10 to about 35 parts by weight of pulverized activated carbon, and about 2 to about 6 parts by weight of pulverized diatomaceous earth, all enclosed in a flexible, pillow-shaped container capable of being kneaded without tearing.

4. A packaged activated carbon diatomaceous earth filter charge replacement comprising about 29.6 parts by weight pulverized activated carbon, about 66 parts by weight water, and about 3.7 parts by weight diatomaceous earth, all enclosed in a flexible, pillow-shaped container capable of being kneaded without tearing.

5. A packaged filter aid comprising about 5% to about 50% diatomaceous earth in water, the composition enclosed in a flexible container capable of being kneaded without tearing.

References Cited by the Examiner
UNITED STATES PATENTS

| | | | |
|---|---|---|---|
| 2,118,271 | 5/38 | Slayter | 206—46 |
| 2,138,874 | 12/38 | Myers | 206—46 |
| 2,649,196 | 8/53 | Arny et al. | 206—46 |
| 3,085,680 | 4/63 | Evans et al. | 206—46 |

THERON E. CONDON, *Primary Examiner.*